United States Patent

Hauser

[15] 3,668,222
[45] June 6, 1972

[54] 11-DESACETOXY-WORTMANNIN

[72] Inventor: Daniel Hauser, 20 Fiechtenweg, 4153 Reinach, Switzerland

[73] Assignee: Sandoz Ltd. Basel, Switzerland

[22] Filed: May 6, 1970

[21] Appl. No.: 35,300

[30] Foreign Application Priority Data

May 14, 1969 Switzerland ..........................7389/69
Sept. 10, 1969 Switzerland ........................13485/69

[52] U.S. Cl. .....................................260/343.2 R, 424/279
[51] Int. Cl. .........................................................C07d 7/18
[58] Field of Search ............................................260/343.2 R

[56] References Cited

OTHER PUBLICATIONS

MacMillan et al., Chemical Communications, (1968) No. 11, pp. 613–614.

Primary Examiner—John M. Ford
Attorney—Gerald D. Sharkin, Robert S. Honor, Frederick H. Weinfeldt, Richard E. Vila and Walter F. Jewell

[57] ABSTRACT

The invention concerns the novel antibiotic 11-desacetoxy-wortmannin of the formula:

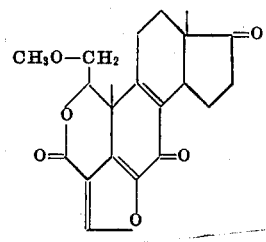

The antibiotic is a fungistatic and anti-inflammatory/edema-inhibiting agent.

1 Claim, No Drawings

11-DESACETOXY-WORTMANNIN

The present invention relates to the new antibiotic 11-desacetoxy-wortmannin of formula I,

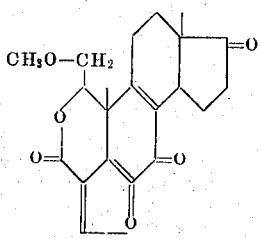

processes for the production of 11-desacetoxy-wortmannin and pharmaceutical compositions thereof.

In accordance with the invention 11-desacetoxy-wortmannin is obtained either a. by isomerizing $\Delta^{9(11)}$-8,9-dihydro-11-desacetoxy-wortmannin of formula II,

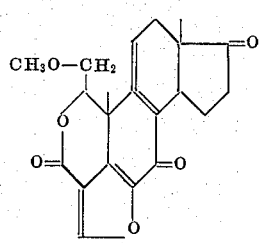

or b by cultivating a strain of the fungus species *Penicillium funiculosum* Thom or of the fungus species *Aspergillus janus* Raper and Thom in a nutrient medium, and isolating the resulting 11-desacetoxy-wortmannin. Purification may be effected in conventional manner, e.g. by extraction or adsorption.

In accordance with process (a) isomerization is effected in an anhydrous organic base. Suitable organic nitrogen bases are pyridine or quinoline. Since the isomerization of the invention proceeds more rapidly at an elevated temperature, it is effected, for example, at the boiling temperature of the organic base.

One embodiment of the process consists in that $\Delta^{9(11)}$-8,9-dihydro-11-desacetoxy-wortmannin is dissolved in pyridine and boiled under reflux in a nitrogen atmosphere. After concentrating by evaporation the resulting 11-desacetoxy-wortmannin is purified in conventional manner by recrystallization.

The $\Delta^{9(11)}$-8,9-dihydro-11-desacetoxy-wortmannin, used as starting material, may be produced by reacting under anhydrous conditions wortmannin of formula III

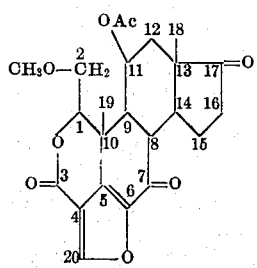

with zinc dust in an organic solvent and in the presence of an acid, for example at the boiling temperature of the organic solvent. After removing the zinc dust by filtration and concentrating the reaction mixture by evaporation, the starting compound is purified in conventional manner by recrystallization and/or chromatography.

In accordance with process (b) 11-desacetoxy-wortmannin is obtained by using as starting material either a new strain of the fungus species *Penicillium funiculosum* Thom or a new strain of the fungus species *Aspergillus janus* Raper and Thom.

The new strain S 3196 of Penicillium funiculosum Thom, used in accordance with the invention, was isolated from a soil sample found in Clarksburg, Maryland, U.S.A., and a specimen of said strain has been deposited with the U.S. Department of Agriculture (Northern Utilization Research and Development Division), Peoria, Illinois, U.S.A., under the reference NRRL 3363. The new strain of the fungus species *Penicillium funiculosum* Thom grows on a malt extract/yeast extract agar at 18°–27° C and forms a compact, green carpet of conidia with brilliant yellow conidiophores. The under side of the colony shows a green-yellow coloration of the substrate.

Morphologically and physiologically the strain conforms to the description as given by C. Thom, U.S. Dept. Agr. Bur. Anim. Ind. Bul. 118, p. 69, fig. 27 (1910), and is illustrated and described in detail in the manual of K. B. Raper and Ch. Thom, "A Manual of the Penicillia," The Williams and Wilkins Co., Baltimore 1949, on pp. 616–620.

The new strain S 8033/F of *Aspergillus janus* Raper and Thom used in accordance with the invention was isolated from a soil sample found in the Republic of Central Africa, and a specimen of said strain has been deposited with the U.S. Department of Agriculture (Northern Utilization Research and Development Division), Peoria, Ill., U.S.A., under the reference NRRL 3807.

The new strain of the fungus species *Aspergillus janus* grows on a glucose/yeast extract/malt extract/peptone agar at 18°–33C, but is preferably cultivated at 18°–27°C. On this medium the fungus grows with a loose, spread mycelium. The nutrient substrate and the under side of the colony are colored by a yellowish pigment. Morphologically and physiologically the new strain of *Aspergillus janus* conforms to the description as given by K. B. Raper and D. J. Fennell, "The Genus Aspergillus," The Williams and Wilkins Co., Baltimore 1965, on pages 476–480.

For the process of the present invention it is likewise possible to use other strains obtained from the new strains of the fungus species *Penicillium funiculosum* Thom or the fungus species *Aspergillus janus* Raper and Thom, for example by selection or mutation by the action of ultraviolet rays or X-rays or by using other measures, e.g. by treatment of laboratory cultures with suitable chemicals.

The new fungus strains of the fungus species *Penicillium funiculosum* Thom or of the fungus species *Aspergillus janus* Raper and Thom may be cultivated on various nutrient media containing the usual nutrients. For example, such strains may use nutrients usually employed for carbon heterotrophic organisms, for example glucose, starch, dextrin, lactose and cane sugar as the carbon source, organic and inorganic nitrogen-containing compounds such as peptone, yeast or meat extracts, ammonium sulphate, ammonium nitrate and amino acids as the nitrogen source, as well as the usual mineral salts and trace elements.

11-desacetoxy-wortmannin may be produced in such a manner that a liquid nutrient medium is inoculated directly with a suspension of spores or with a preculture prepared over a suspension of spores of a new strain of *Penicillium funiculosum* Thom or of *Aspergillus janus* Raper and Thom. In the case of the strain *Penicillium funiculosum* Thom the culture is incubated at 27°C for 5 to 10 days, and in the case of the strain of Aspergillus janus Raper and Thom at 18°C for 3 to 4 days. Cultivation may be effected under aerobic conditions by static surface culture fermentation or by submerged culture fermentation with shaking, or in fermenters provided with devices for introducing air or oxygen and agitators. As soon as the maximum amount of antibiotic has been produced, the culture solution is filtered and the antibiotic is obtained from the filtrate in conventional manner by extractive or adsorptive methods.

One especially preferred method consists in the extraction of the filtrate with ethyl acetate, although other organic solvents, e.g. benzene, chloroform, butyl acetate, methylene chloride or butanol, may likewise be used. The solvent is subsequently removed from the extracts, e.g. by distillation, and the desired antibiotic is isolated by purifying the residue chromatographically on adsorbents, e.g. alumina, silica gel or magnesium silicate, or by countercurrent distribution.

11-desacetoxy-wortmannin is useful as a fungistatic as illustrated by its effect on human pathogenic or plant parasite fungi. More particularly the antibiotic shows strong activity in vitro against *Histoplasma capsulatum*, *Candida krusei*, *Trichophyton tonsurans*, *Epidermophyton floccosum* and *Microsporum canis*. In use as a fungistatic, the antibiotic can normally be applied topically, and powders, sprays, ointments or tinctures, containing 0.1 to 2 percent of the active agent, may be employed for such application.

The antibiotic is furthermore useful because it possesses pharmacological activity in animals. More particularly, the antibiotic is useful as an antiinflammatory/edema-inhibiting agent as indicated by the Carrageen edema test, the Carrageen granuloma cyst test and the CMC granuloma test in the awake rat.

The dose to be administered will naturally vary depending on the mode of administration and the condition to be treated. However, satisfactory results are generally obtained at doses between 1 and 15 mg/kg body weight. The dose may be administered in 2 to 3 portions or in retard form. For larger mammals a suitable daily dose is between about 1 and 50 mg, and unit dosage forms contain between 0.3 and 50 mg of active agent, in association with a liquid or solid carrier.

In the following non-limitative examples all temperatures are indicated in degrees Centigrade. The melting or decomposition points were determined on a Kofler block.

EXAMPLE 1

5 g of $\Delta^{9(11)}$-8,9-dihydro-11-desacetoxy-wortmannin are dissolved in 200 cc of pyridine and the solution is boiled under reflux in an atmosphere of nitrogen for 60 hours. The reaction mixture is subsequently concentrated by evaporation and the residue recrystallized twice from methanol. Pure 11-desacetoxy-wortmannin, having a M.P. of 178°–180°, is obtained.

The $\Delta^{9(11)}$-8,9-dihydro-11-desacetoxy-wortmannin, used as starting material, may be produced as follows:

10 g of wortmannin are dissolved in 1 liter of ethanol and after the addition of 10 g of zinc dust and 10 cc of glacial acetic acid the mixture is boiled under reflux for 15 minutes. After cooling, the reaction mixture is filtered and concentrated by evaporation. The residue is taken up in methylene chloride, is filtered and again concentrated by evaporation. Subsequent recrystallization from methanol yields crude $\Delta^{9(11)}$-8,9-dihydro-11-desacetoxy-wortmannin. This is chromatographed on 260 g of silica gel. Chloroform/methanol (49:1) is used as eluant, whereby fractions of 500 cc are collected. Fractions 3 to 8 are combined, the eluant is evaporated and the residue recrystallized from methylene chloride with the addition of methanol. M.P. 202°–206°.

EXAMPLE 2

150 liters of a nutrient solution
(of which each liter contains
  20 g of cerelose
  2 g of malt extract
  2 g of yeast extract
  2 g of $KH_2PO_4$
  2 g of $MgSO_4 \cdot 7 H_2O$ and
  demineralized water to make up 1 liter)
are inoculated in a fermenter with a suspension of spores of the strain NRRL 3363 of *Penicillium funiculosum* Thom, and incubation is effected at 27° for 112 hours while aerating (150 liters of air per minute) and stirring (100 revolutions per minute). The culture liquid is filtered and the filtrate extracted twice with 100 liter amounts of ethyl acetate. The organic phase is washed once with 60 liters of water and concentrated in a vacuum to 5 liters. The concentrate is dried over anhydrous magnesium sulphate and is concentrated by evaporation. The residue is divided thrice between petroleum ether and methanol/water (9:1). The methanol phase is concentrated and subsequently extracted thrice with ethyl acetate. The ethyl acetate solutions are washed once with water, dried over anhydrous magnesium sulphate and concentrated by evaporation. The extract is chromatographed on a 50-fold quantity of silica gel. 11-desacetoxy-wortmannin is eluted with chloroform/methanol (99:1), and after recrystallizing twice from methylene chloride/ether, has a M.P. of 178°–180°.

EXAMPLE 3

30 liters of a nutrient solution, of which each liter has the composition indicated in example 2, are inoculated in a fermenter with 3 liters of a preculture of the strain NRRL 3807 of *Aspergillus janus*, prepared as described hereinafter, and incubation is effected at 18° for 90 hours while aerating (6 to 24 liters of air per minute) and stirring (150 revolutions per minute). The culture liquid is filtered and the filtrate extracted twice with 20 liter amounts of ethyl acetate. The organic phase is washed once with 12 liters of water and is concentrated in a vacuum to 1 liter. The concentrate is dried over anhydrous magnesium sulphate and concentrated by evaporation. The residue is divided thrice between petroleum ether and methanol/water (9:1). The methanol phase is concentrated and subsequently extracted thrice with ethyl acetate. The ethyl acetate solutions are washed once with water, are dried over anhydrous magnesium sulphate and concentrated by evaporation. The extract is chromatographed on a 50-fold quantity of silica gel. 11-desacetoxy-wortmannin is eluted with chloroform/methanol (99:1), and after recrystallizing twice from methylene chloride/ether, has a M.P. of 178°–180°.

The preculture used for inoculation is obtained as follows: 3 liters of the medium indicated in example 2, additionally containing 2 g of peptone per liter of solution, are inoculated with a suspension of spores of the strain NRRL 3807 and inoculation is effected at 27° for 7 days while shaking.

What is claimed is:
1. 11-Desacetoxy-wortmannin of the formula:

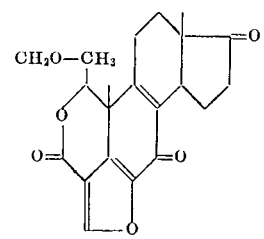

* * * * *

UNITED STATES PATENT OFFICE
CERTIFICATE OF CORRECTION

Patent No. 3,668,222          Dated    June 6, 1972

Inventor(s) DANIEL HAUSER

It is certified that error appears in the above-identified patent and that said Letters Patent are hereby corrected as shown below:

Column 2, line 32, " $18°-33C$ " should read -- $18°-33°C$ --.

Column 4, Claim 1, that portion of the formula reading

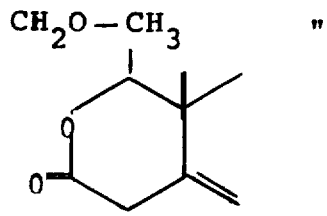 "     should read -- 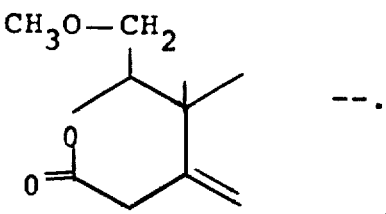 --.

Signed and sealed this 9th day of July 1974.

(SEAL)
Attest:

McCOY M. GIBSON, JR.          C. MARSHALL DANN
Attesting Officer             Commissioner of Patents